A. L. WILLIAMS.
TROLLEY HEAD.
APPLICATION FILED DEC. 14, 1915.
1,216,901.
Patented Feb. 20, 1917.
2 SHEETS—SHEET 1.
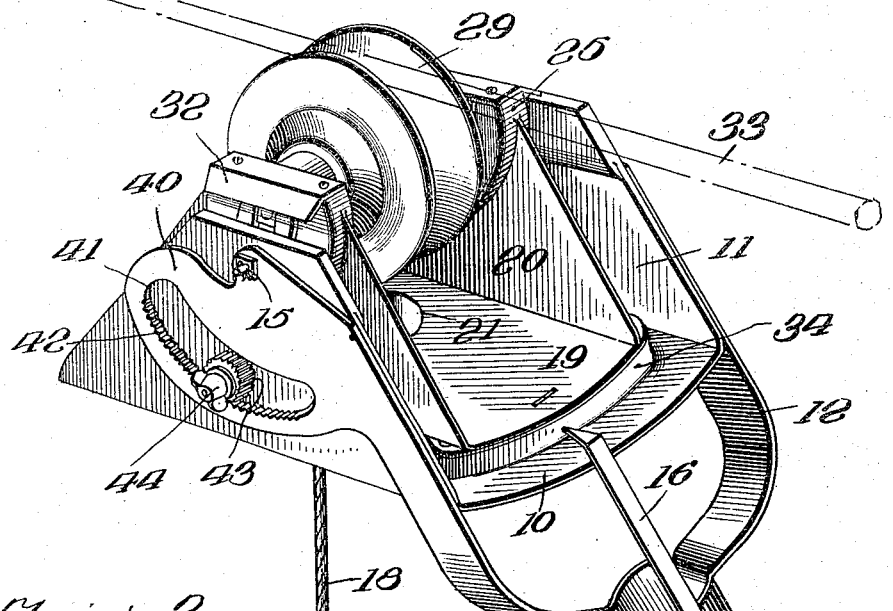
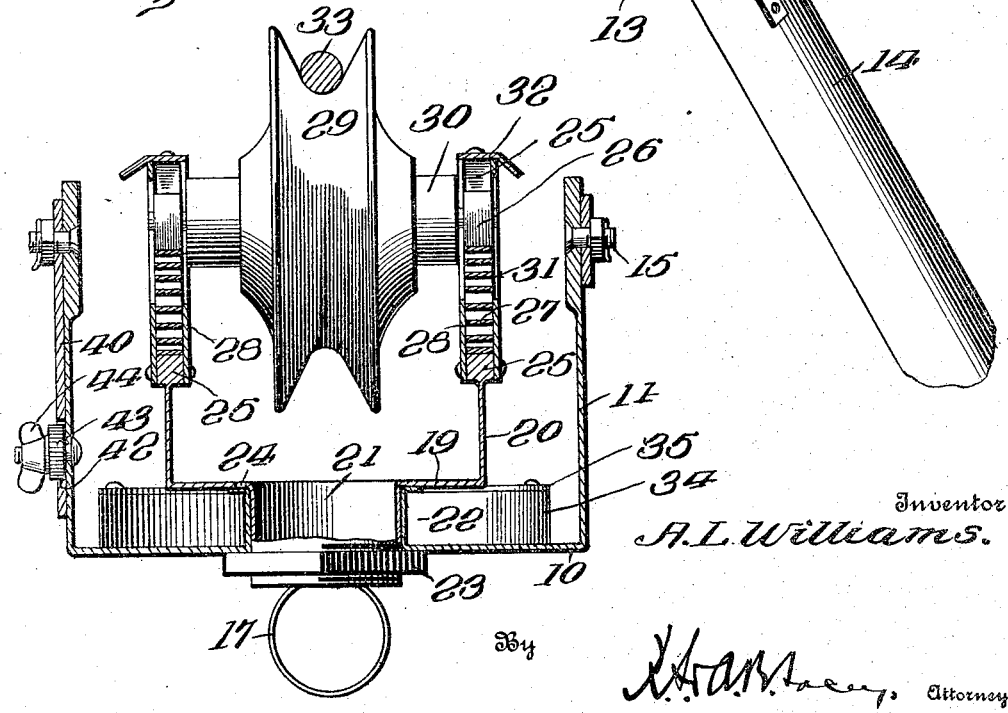
Inventor
A. L. Williams.
By
[signature], Attorneys.

A. L. WILLIAMS.
TROLLEY HEAD.
APPLICATION FILED DEC. 14, 1915.
1,216,901.  Patented Feb. 20, 1917.
2 SHEETS—SHEET 2.
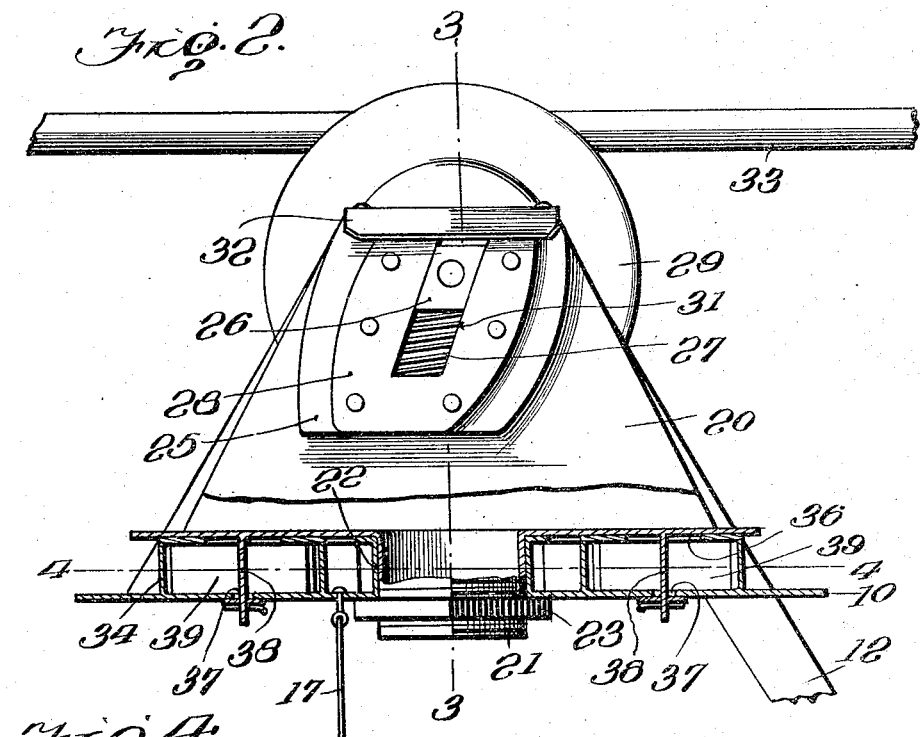
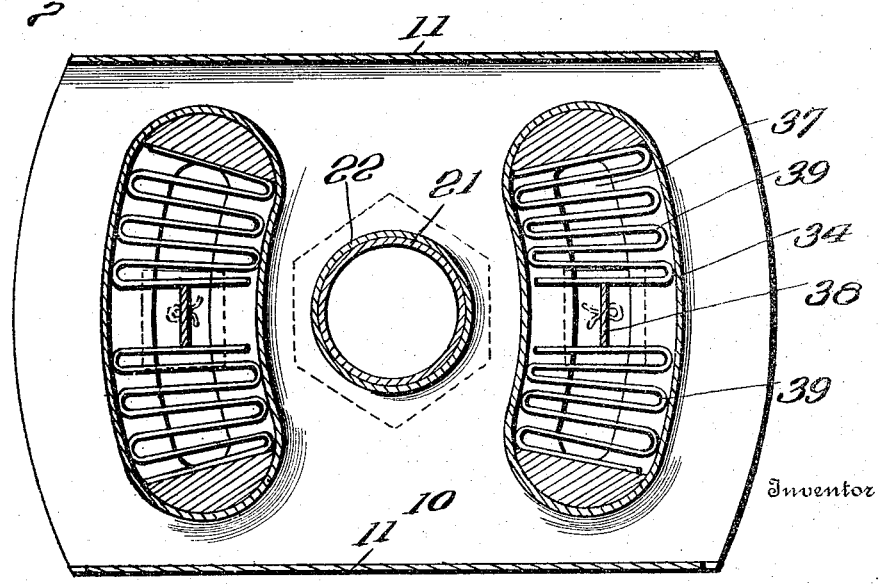
Inventor
A. L. Williams.
By
Attorneys.

UNITED STATES PATENT OFFICE.

ALFONZO L. WILLIAMS, OF LOS ANGELES, CALIFORNIA.

TROLLEY-HEAD.

1,216,901.  Specification of Letters Patent.  Patented Feb. 20, 1917.

Application filed December 14, 1915. Serial No. 66,767.

*To all whom it may concern:*

Be it known that I, ALFONZO L. WILLIAMS, a citizen of the United States, residing at Los Angeles, in the county of Los Angeles and State of California, have invented certain new and useful Improvements in Trolley-Heads, of which the following is a specification.

This invention contemplates an improved trolley head and has as its primary object to provide a device of this character wherein the head will be mounted to rock in a vertical plane upon the trolley pole so that the trolley wheel may readily follow any unevenness in the trolley wire and wherein the trolley wheel will be supported to turn in a horizontal plane relative to the wire so that the said wheel may readily follow the wire at a curve.

The invention has as a further object to provide a construction wherein the rocking movement of the head will be normally controlled to maintain the trolley wheel properly presented to engage the trolley wire and wherein yieldable means will be provided for normally holding the trolley wheel against horizontal turning movement relative to the wire so that the said yieldable means will act to hold the wheel in engagement with the wire at a curve and will return the wheel to normal position after it has passed over the curve in the wire.

And a still further object of the invention is to provide a construction wherein the trolley wheel will itself, be yieldably supported to engage the trolley wire so that the vibration communicated to the trolley pole by the wheel will be reduced to a minimum and further so that the trolley wheel will not become disengaged from the wire.

Other and incidental objects will appear as the description proceeds and in the drawing wherein I have illustrated the preferred embodiment of the invention and wherein similar reference characters designate corresponding parts throughout the several views, Figure 1 is a perspective view of my improved trolley head showing the trolley in engagement with a trolley wire, Fig. 2 is a vertical sectional view taken through the head and more particularly showing the mounting of the carriage or harp for the trolley wheel, Fig. 3 is a transverse sectional view taken on the line 3—3 of Fig. 2 and more particularly showing the mounting of the trolley wheel, and Fig. 4 is a longitudinal sectional view taken on the line 4—4 of Fig. 3 and particularly showing the springs arranged to coöperate with the carriage of the trolley wheel for maintaining the said carriage in normal position.

In carrying out my invention, I employ a yoke or body portion 10 which is formed with upstanding parallel sides 11, the free extremities of which are slightly thickened. Pivotally supporting the yoke and embracing the sides thereof, is a fork having arms 12 and 13 respectively which may be integrally formed at their inner extremities with a socket member 14 adapted to fit over the outer end of a trolley pole. This socket member may be of tubular form as illustrated in the drawings or may be of any other suitable character in order that it may be readily fixed to the trolley pole to support the head thereon. Connecting the outer ends of the arms 12 and 13 with the free extremities of the sides 11 of the yoke are pivot pins 15 which extend through the thickened portions of said sides. Secured to and extending longitudinally from the outer end of the socket member 14 is a guard finger 16 which projects up over one end of the yoke and is adapted to prevent the engagement of a cross wire beneath the yoke should the trolley wheel become displaced from the trolley wire and be caused to strike the cross wire, the guard acting to direct the cross wire over the head. Swiveled to the bottom of the yoke adjacent its opposite extremity is a ring 17 to which is connected a trolley rope 18. The yoke may be formed as a single casting or may, if desired, be constructed of suitable sheet metal.

Mounted within the yoke 10 is a carriage or harp 19 having spaced upstanding sides 20. Depending from the bottom of the carriage is a tubular extension 21 which is fitted freely through a suitable opening formed in the bottom of the yoke 10 and is rotatably supported by an upstanding sleeve 22 formed on the yoke to surround the said opening, the upper margin of the sleeve being provided with a lateral flange seating against the bottom of the carriage. The outer extremity of the extension 21 is preferably screw threaded to receive a nut 23 for connecting the carriage with the yoke and preferably, the bottom of the carriage is provided with one or more openings 24 through which lubricant may be introduced between the extension and the said sleeve.

The outer extremities of the sides 20 of the carriage are provided with thickened portions 25 which are formed with oppositely disposed and vertically inclined slots which slidably receive bearing blocks 26. Interposed between the bearing blocks 26 and the bottoms of the said slots are springs 27 of any suitable character which are adapted to yieldably support the blocks and which are retained in position by opposed face plates 28 seating against opposite side faces of the thickened portions 25 and detachably secured thereto by screws or other suitable fastening devices.

Rotatably mounted upon the bearing blocks 26 is a trolley wheel 29 which is provided with trunnions 30, the reduced portions of which extend freely through the blocks and are received within suitable slots 31 formed in the plates 28, the plates being adapted to guide the bearing blocks 26 in their vertical sliding movement in the slots of the thickened portions 25. Connected to the upper ends of the thickened portions 25 by screws or other suitable fastening devices, are cap or guard plates 32 which project laterally from the sides 20 of the carriage toward the sides 11 of the yoke to overhang the slots in the outermost face plates 28 and consequently tend to prevent rain from entering through the slots in the said plates to gain access to the springs 27.

It will now be observed that the springs 27 will yieldably support the trolley wheel 19 to engage the trolley wire which, for convenience, has been designated 33. These springs will be adapted to compensate for any slight unevenness in the wire and will hold the wheel firmly thereagainst so that the said wheel cannot easily become displaced from the wire while the presence of the said springs will reduce to a minimum, the vibration communicated to the trolley pole by the trolley wheel.

Formed on the bottom of the yoke 10 adjacent opposite ends of the carriage 19, are upstanding arcuate casings or housings 34 which are arranged concentric to the axis of rotation of the tubular extension 21. These housings are closed by removable cover plates 35 secured thereto by screws or other suitable fastening devices. Formed in the cover plates 35 are arcuate slots 36, best shown in Fig. 2, which are arranged opposite similar slots 37 formed in the bottom of the yoke 10 and opening into the housings 34.

Depending from the bottom of the carriage 19 adjacent opposite ends thereof, are suitable arms or lugs 38 which respectively project through the slots 36 and 37 associated with the housings 34 and receive suitable washers at the lower ends thereof which confront the bottom of the yoke 10, as more particularly shown in Fig. 2. The arms 38 are thus mounted to move longitudinally of the housings 34 as the carriage is rotated upon the yoke 10 and arranged to coöperate with the said arms are sinusoidal springs 39, a pair of said springs being freely fitted within each of the housings 34 and arranged to bear against one of the arms 38 upon opposite sides thereof, as clearly illustrated in Fig. 4.

By this construction, it will be observed that the springs 39 are adapted to hold the carriage 19 against turning movement within the yoke 10 and will normally maintain the said carriage in proper alinement therein. However, when the trolley wheel 29 is caused to traverse a curve in the wire 33, the carriage 19 will be permitted to turn in a horizontal plane relative to the wire so that the trolley wheel may readily follow the wire with the springs 39 yieldably holding the wheel in engagement therewith. Consequently, the trolley wheel cannot become displaced from the wire and after said wheel has passed over the curve therein, the springs 39 will return the carriage to normal position. Moreover, it is to be observed that by the use of the springs 39, the wheel 29 will be prevented from wearing more upon one side of its groove than upon the other since the said springs will at all times act to normally maintain the carriage 19 in proper alinement within the yoke 10; so that the trolley wheel will engage the wire with the wire seated in the bottom of the groove of the said wheel.

It will now be clear that the yoke 10 may be rocked upon the arms 12 and 13 in a vertical plane to compensate for any unevenness in the trolley wire so that, at all times, the trolley wheel 29 will be properly presented to engage therewith. However, to normally control this rocking or swinging movement of the yoke and prevent any violent pivotal movement thereof which might be caused by the trolley wheel 29 coming in contact with an obstruction upon the wire 33, I form the outer extremity of the arm 13 with an enlarged terminal or downwardly presented sector 40 which is formed with an arcuate slot 41 having the lower edge thereof provided with teeth or formed into a rack 42. Arranged to mesh with the teeth 42 is a toothed wheel 43 which projects through the slot 41 and is rotatably supported upon the adjacent side wall 11 of the yoke. This wheel 43 is so mounted that while being adapted to turn when the yoke 10 is pivotally rocked upon the arms 12 and 13, it will, at the same time, have such frictional engagement with the adjacent arm 11 of the yoke as to counteract the absolute free swinging movement of the yoke, the wheel when rotated being arranged to frictionally engage at its inner end with the said arm. This frictional engagement between the wheel 43 and the yoke may be regulated by a clamp nut 44 carried by the pin supporting the wheel and which may be properly turned to clamp the wheel against the adjacent side 11 of the yoke.

It will therefore be seen that the wheel 43 will act in the capacity of a friction disk or drum having operative connection with the yoke fork and with the yoke and adjustable to control the swinging movement of the yoke upon the said fork. Consequently, the normal swinging movement of the yoke 10 may be regulated to suit varying conditions, such for instance as would be brought about by a difference in weight between an old and a new trolley wheel. In this connection, attention is directed to the fact that by removing the cap plates 32, the trolley wheel 39 may be readily displaced and its position relative to the yoke reversed.

While I have indicated my improved trolley head as provided with a tooth wheel 43 for controlling the swinging movement of the yoke 10 upon the arms 12 and 13, still, I do not wish to be limited to this particular construction since, if desired, the use of this wheel may be eliminated so that the yoke will hang free upon the said arms. In this event, the arms 12 and 13 will be identical in construction and the sector 40 upon the arm 13 eliminated. Moreover, if desired, the yoke 10 may be tightly connected to the arms 12 and 13 by the bolts 15 or said arms may be formed integral with the yoke so that the yoke will be rigidly supported upon the arms and the swinging movement of the yoke eliminated. However, it will be seen that by providing the tooth 43, the nut 44 may be adjusted relative to the said wheel to permit the yoke to swing entirely free; to cause the said wheel to partially control the swinging movement of the yoke, or to hold the wheel fixed so that the yoke will be rigidly supported upon the arms of the fork.

Having thus described my invention, what I claim and desire to secure by Letters Patent is:

1. A trolley head including a fork, a yoke swingingly mounted thereon, means associated with the yoke and fork for controlling the swinging movement of the yoke upon the fork, and a trolley wheel operatively supported by the yoke.

2. A trolley head including a fork, a yoke swingingly mounted thereon, means engaging the fork and having frictional contact with the yoke for controlling the swinging movement of the yoke upon the fork, and a trolley wheel operatively supported by the yoke.

3. A trolley head including a fork, a yoke swingingly mounted thereon, a rack carried by one arm of the fork, a toothed wheel carried by the yoke and engaging said rack, means for urging the said wheel into frictional engagement with the yoke for controlling the swinging movement of the yoke upon the fork, and a trolley wheel operatively supported upon the yoke.

4. A trolley head including a fork, a yoke swingingly mounted thereon, a carriage rotatable upon the yoke and provided with an arm, yieldable means bearing against opposite sides of said arm and normally holding the carriage against rotation upon the yoke, and a trolley wheel mounted upon the carriage.

5. A trolley head including a fork, a yoke carried thereby, a housing supported by the yoke, a carriage rotatable upon the yoke and provided with an arm shiftable longitudinally of the said housing, yieldable means disposed within the said housing to bear against opposite sides of said arm for normally holding the carriage against rotation upon the yoke, and a trolley wheel mounted upon the carriage.

6. A trolley head including a fork, a yoke swingingly mounted thereon, a guard associated with the fork and adapted to engage the yoke for limiting the yoke in its swinging movement in one direction upon the fork, and a trolley wheel operatively mounted upon said yoke.

7. A trolley head including a fork, a yoke swingingly mounted thereon, a rack carried by one arm of the fork, a pin carried by the yoke, a toothed wheel rotatable upon said pin and engaging the rack, a set screw carried by the pin and adjustable to engage said wheel for urging the wheel into frictional contact with the yoke for controlling the swinging movement of the yoke relative to the fork, and a trolley wheel operatively mounted upon the said yoke.

In testimony whereof I affix my signature.

ALFONZO L. WILLIAMS. [L. S.]